United States Patent
Sievert et al.

(10) Patent No.: US 9,355,554 B2
(45) Date of Patent: May 31, 2016

(54) SYSTEM AND METHOD FOR IDENTIFYING MEDIA AND PROVIDING ADDITIONAL MEDIA CONTENT

(75) Inventors: Michael Sievert, Yarrow Point, WA (US); Blake C. Ramsdell, Sammamish, WA (US); Robert D. Dickinson, III, Woodinville, WA (US); Howard Locker, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 436 days.

(21) Appl. No.: 12/415,638

(22) Filed: Mar. 31, 2009

(65) Prior Publication Data

US 2010/0131847 A1  May 27, 2010

Related U.S. Application Data

(60) Provisional application No. 61/116,972, filed on Nov. 21, 2008.

(51) Int. Cl.
| | |
|---|---|
| *H04N 5/445* | (2011.01) |
| *G08C 17/00* | (2006.01) |
| *G06Q 30/02* | (2012.01) |

(52) U.S. Cl.
CPC ............ *G08C 17/00* (2013.01); *G06Q 30/0254* (2013.01); *G06Q 30/0255* (2013.01)

(58) Field of Classification Search
CPC .................. H04N 5/44543; H04N 21/4622
USPC ................................ 725/37, 51, 40, 49, 53
See application file for complete search history.

(56) References Cited

U.S. PATENT DOCUMENTS

| | | | |
|---|---|---|---|
| 6,018,768 A * | 1/2000 | Ullman et al. | 709/218 |
| 6,097,441 A | 8/2000 | Allport | |
| 6,240,555 B1 | 5/2001 | Shoff et al. | |
| 6,411,725 B1 * | 6/2002 | Rhoads | 382/100 |
| 6,446,261 B1 | 9/2002 | Rosser | |
| 6,496,981 B1 * | 12/2002 | Wistendahl et al. | 725/112 |
| 6,867,787 B1 | 3/2005 | Shimizu et al. | |
| 6,973,669 B2 * | 12/2005 | Daniels | 725/112 |
| 7,308,485 B2 * | 12/2007 | Roberts et al. | 709/219 |
| 7,421,376 B1 | 9/2008 | Caruso et al. | |
| 7,516,074 B2 | 4/2009 | Bilobrov | |

(Continued)

FOREIGN PATENT DOCUMENTS

| | | |
|---|---|---|
| CN | 1679051 A1 | 10/2005 |
| CN | 1989768 A1 | 6/2007 |

(Continued)

OTHER PUBLICATIONS

Website, 3 pages, available at http://en.wikipedia.org/wiki/Digital_video_fingerprinting, as of Jan. 21, 2011.

(Continued)

*Primary Examiner* — Sumaiya A Chowdhury
(74) *Attorney, Agent, or Firm* — Ference & Associates LLC

(57) ABSTRACT

The invention broadly contemplates a system providing an integrated television and Internet media experience. The system provides for automatic integration of television and Internet media via identification of source input media, analysis of the identified source input media, retrieval of related Internet content, and integration of the source media and the related Internet content for display.

12 Claims, 4 Drawing Sheets

(56) References Cited

U.S. PATENT DOCUMENTS

| | | | |
|---|---|---|---|
| 7,535,478 B2 | 5/2009 | Dunton et al. | |
| 7,623,823 B2 | 11/2009 | Zito et al. | |
| 7,975,225 B2* | 7/2011 | Li et al. | 715/721 |
| 7,984,473 B1 | 7/2011 | Casile et al. | |
| 8,122,465 B2* | 2/2012 | Davis et al. | 725/20 |
| 2001/0054181 A1 | 12/2001 | Corvin | |
| 2002/0092031 A1 | 7/2002 | Dudkiewicz et al. | |
| 2002/0162118 A1* | 10/2002 | Levy et al. | 725/110 |
| 2003/0028882 A1* | 2/2003 | Davis et al. | 725/44 |
| 2003/0093790 A1 | 5/2003 | Logan et al. | |
| 2003/0154481 A1 | 8/2003 | Andersen et al. | |
| 2003/0192060 A1 | 10/2003 | Levy | |
| 2003/0208755 A1 | 11/2003 | Zimmerman | |
| 2003/0229900 A1* | 12/2003 | Reisman | 725/87 |
| 2004/0025176 A1 | 2/2004 | Franklin et al. | |
| 2004/0031058 A1 | 2/2004 | Reisman | |
| 2004/0117828 A1 | 6/2004 | Parker et al. | |
| 2004/0194130 A1 | 9/2004 | Konig et al. | |
| 2004/0237102 A1 | 11/2004 | Konig et al. | |
| 2005/0018216 A1* | 1/2005 | Barsness et al. | 358/1.6 |
| 2005/0120391 A1 | 6/2005 | Haynie et al. | |
| 2005/0147256 A1 | 7/2005 | Peters et al. | |
| 2005/0210526 A1* | 9/2005 | Levy et al. | 725/113 |
| 2005/0251823 A1 | 11/2005 | Saarikivi | |
| 2005/0264704 A1 | 12/2005 | Leinonen | |
| 2006/0064734 A1 | 3/2006 | Ma | |
| 2006/0218580 A1 | 9/2006 | Bushnell | |
| 2006/0230415 A1 | 10/2006 | Roeding | |
| 2007/0094703 A1* | 4/2007 | Nygaard et al. | 725/135 |
| 2007/0130580 A1 | 6/2007 | Covell et al. | |
| 2007/0136804 A1 | 6/2007 | Oshawa et al. | |
| 2007/0142101 A1 | 6/2007 | Seshagiri et al. | |
| 2007/0180461 A1 | 8/2007 | Hilton | |
| 2007/0250848 A1 | 10/2007 | Gorti et al. | |
| 2007/0250901 A1 | 10/2007 | McIntire et al. | |
| 2007/0300261 A1* | 12/2007 | Barton et al. | 725/58 |
| 2008/0066100 A1 | 3/2008 | Brodersen et al. | |
| 2008/0082510 A1 | 4/2008 | Wang et al. | |
| 2008/0086754 A1 | 4/2008 | Chen et al. | |
| 2008/0089551 A1 | 4/2008 | Heather et al. | |
| 2008/0098432 A1* | 4/2008 | Hardacker et al. | 725/51 |
| 2008/0098433 A1 | 4/2008 | Hardacker et al. | |
| 2008/0127272 A1 | 5/2008 | Cragun et al. | |
| 2008/0244638 A1* | 10/2008 | Ryden | 725/34 |
| 2008/0311963 A1 | 12/2008 | Strawn | |
| 2009/0077580 A1 | 3/2009 | Konig et al. | |
| 2009/0307721 A1 | 12/2009 | Afram et al. | |
| 2010/0037264 A1 | 2/2010 | Hardacker et al. | |
| 2010/0049719 A1 | 2/2010 | Payne et al. | |
| 2010/0131363 A1 | 5/2010 | Sievert et al. | |
| 2010/0131979 A1 | 5/2010 | Sievert et al. | |
| 2010/0131986 A1 | 5/2010 | Locker et al. | |
| 2010/0131997 A1 | 5/2010 | Locker et al. | |
| 2010/0218211 A1 | 8/2010 | Herigstad et al. | |
| 2011/0072480 A1 | 3/2011 | Stone | |

FOREIGN PATENT DOCUMENTS

| | | |
|---|---|---|
| CN | 101053164 A1 | 10/2007 |
| CN | 101073050 A1 | 11/2007 |
| CN | 101120377 A1 | 2/2008 |
| CN | 101543009 A1 | 9/2009 |
| CN | 101656062 A1 | 2/2010 |
| EP | 1023807 | 7/2002 |
| WO | 2010027784 A2 | 3/2010 |

OTHER PUBLICATIONS

Website, 1 page, available at http://www.digitalsmiths.com, as of Feb. 4, 2011.
Oxford English Dictionary, "automatic" (definition), http://oed.com/view/Entry/13464, accessed Apr. 12, 2012 by U.S. Patent & Trademark Office, U.S. Appl. No. 12/494,539, Final Office Action mailed Apr. 17, 2012, 15 pages.
Fogg, Cynthia M., Non-Final Office Action in U.S. Appl. No. 12/494,539 (Feb. 11, 2015) (26 pages).
Kasutani, Eiji, et al., Linking TV Programs with Internet Contents based on Video Fingerprinting, 2006, IEEE, pp. 203-204.
Kurien, Christine A., Office Action in U.S. Appl. No. 12/463,020, USPTO, Jun. 17, 2015, 12 pages.
Sievert, Michael, Amendment in Response to Final Office Action in U.S. Appl. No. 12/494,539, Dec. 15, 2014, 12 pages.
Sievert, Michael, Amendment in Response to Final Office Action in U.S. Appl. No. 12/494,539, May 11, 2015, 12 pages.
Sievert, Michael, Amendment in Response to Non Final Office Action in U.S. Appl. No. 12/494,507, Dec. 22, 2014, 13 pages.
Locker, Howard, Amendment in Response to Non Final Office Action in U.S. Appl. No. 12/463,020, Feb. 18, 2015, 13 pages.
Kurien, Christen A., Non Final Office Action in U.S. Appl. No. 12/463,020, Nov. 18, 2014, 33 pages, U.S. Patent & Trademark Office, Washington, DC, United States.
Wikipedia: "Digital video fingerprinting" Version Feb. 24, 2010, pp. 1-4 http:en.wikipedia.org/w/index.php? title=Digital_videofingerprinting&oldid=346007180.
Wikipedia: "High-bandwidth Digital Content Protection" Version Jan. 25, 2010, pp. 1-5, http://en.wikipedia.org/w/index.php?title=High-bandwidth:Digital_Content_Protection&oldid=6977091.
Osman Bilal Ahmed, Afaf, Non Final Office Action in U.S. Appl. No. 12/494,507, Sep. 29, 2014, 7 pages, U.S. Patent & Trademark Office, Washington, DC, United States.
Fogg, Cynthia M., Final Office Action in U.S. Appl. No. 12/494,539, Aug. 14, 2014, 16 pages, U.S. Patent & Trademark Office, Washington, DC, United States.
Kurien, Christen A., Non-Final Office Action in U.S. Appl. No. 12/463,020, USPTO (Apr. 3, 2012) (14 pages).
Locker, Howard, Response to Non-Final Office Action in U.S. Appl. No. 12/463,020, (Aug. 3, 2012) (13 pages).
Kurien, Christen A., Final Office Action in U.S. Appl. No. 12/463,020, USPTO (Dec. 5, 2012) (16 pages).
Locker, Howard, RCE Amendment in Response to Final Office Action in U.S. Appl. No. 12/463,020 (Apr. 5, 2013) (12 pages).
Kurien, Christen A., Non-Final Office Action in U.S. Appl. No. 12/463,020, (Sep. 17, 2013) (11 pages).
Locker, Howard, Response to Non-Final Office Action in U.S. Appl. No. 12/463,020, (Dec. 17, 2013) (12 pages).
Kurien, Christen A., Final Office Action in U.S. Appl. No. 12/463,020, USPTO (Jan. 15, 2014) (13 pages).
Ahmed, Affaf, Non-Final Office Action in U.S. Appl. No. 12/494,507, USPTO (Jan. 31, 2012) (10 pages).
Sievert, Michael, Amendment in Response to Non-Final Office Action in U.S. Appl. No. 12/494,507, (Apr. 30, 2012) (11 pages).
Ahmed, Affaf, Final Office Action in U.S. Appl. No. 12/494,507, USPTO (Jul. 5, 2012) (9 pages).
Sievert, Michael,, RCE Amendment in Response to Final Office Action in U.S. Appl. No. 12/494,507, (Oct. 5, 2012) (10 pages).
Ingvoldstad, Bennett, Non-Final Office Action in U.S. Appl. No. 12/494,539, USPTO (Sep. 27, 2011) (10 pages).
Sievert, Michael, Amendment in Response to Non-Final Office Action in U.S. Appl. No. 12/494,539, (Jan. 27, 2012) (16 pages).
Ingvoldstad, Bennett, Final Office Action in U.S. Appl. No. 12/494,539, USPTO (Apr. 17, 2012) (12 pages).
Sievert, Michael, RCE Amendment in Response to Final Office Action in U.S. Appl. No. 12/494,539, (Jul. 17, 2012) (11 pages).
Ingvoldstad, Bennett, Non-Final Office Action in U.S. Appl. No. 12/494,539, USPTO (Jan. 31, 2014) (15 pages).
Locker, Howard, RCE Amendment in Response to Final Office Action in U.S. Appl. No. 12/463,020, (Apr. 15, 2014) (12 pages).
Sievert, Michael, Amendment in Response to Non Final Office Action in U.S. Appl. No. 12/494,539, (Apr. 30, 2014) (13 pages).
Ingvoldstad, Bennett, Non-Final Office Action in U.S. Appl. No. 12/494,470, USPTO (Sep. 15, 2011) (11 pages).
Locker, Howard, Amendment in Response to Non-Final Office Action in U.S. Appl. No. 12/494,470, (Dec. 15, 2011) (17 pages).
Ingvoldstad, Bennett, Final Office Action in U.S. Appl. No. 12/494,470, USPTO (Feb. 10, 2012) (17 pages).

(56) References Cited

OTHER PUBLICATIONS

Locker, Howard, Amendment in Response to Final Office Action in U.S. Appl. No. 12/494,470, (May 10, 2012) (11 pages).
Ingvoldstad, Bennett, Non-Final Office Action in U.S. Appl. No. 12/494,470, USPTO (Feb. 11, 2014) (10 pages).
Locker, Howard, Amendment in Response to Non-Final Office Action in U.S. Appl. No. 12/494,470 (May 12, 2014) (10 pages).
Osman Bilal Ahme, Afaf, Final Office Action in U.S. Appl. No. 12/494,507 (Apr. 22, 2015) (12 pages).
Sievert, Michael, Amendment in Response to Final Office Action in U.S. Appl. No. 12/494,507, Jul. 22, 2015, 21 pages.
Locker et al., Notice of Appeal for U.S. Appl. No. 12/463,020, Sep. 17, 2015, 1 page.
Locker et al., Appeal Brief for U.S. Appl. No. 12/463,020, Nov. 17, 2015, 37 pages.
Sievert et al., Supplemental Amendment for U.S. Appl. No. 12/494,539, Nov. 9, 2015, 12 pages.
Osman Bilal Ahmed, Afaf, Non-Final Office Action for U.S. Appl. No. 12/494,507, Jan. 6, 2016, 16 pages.
Fogg, Cynthia M., Non-Final Office Action for U.S. Appl. No. 12/494,539, Mar. 8, 2016, 23 pages.
Sievert, Michael, Amendment Response to Non-Final Office Action in U.S. Appl. No. 12/494,507, Apr. 6, 2016, 20 pages.

\* cited by examiner

SYSTEM AND METHOD FOR IDENTIFYING MEDIA AND PROVIDING ADDITIONAL MEDIA CONTENT

CLAIM FOR PRIORITY

This application claims priority from U.S. Provisional Patent Application No. 61/116,972 filed Nov. 21, 2008, which is fully incorporated by reference herein.

FIELD OF THE INVENTION

The invention is directed to a media management system that manages multi-media data from a variety of sources. More specifically, the invention is directed to devices, systems and methods for identifying source media and providing targeted and integrated media experiences for consumers of television and Internet services.

BACKGROUND OF THE INVENTION

An increasing number of households now have high definition televisions (HDTVs) and broadband Internet connections. Consumers watch a significant amount of television on these HDTVs. Consumers are also increasingly accessing media content via the Internet, primarily on traditional desktop and laptop computers, as well as mobile computing devices and the like. These trends are very likely to continue as more HD programming becomes available, more consumers buy HDTVs, and more consumers switch to or obtain wired or wireless broadband Internet connections.

Consumers commonly use computing and mobile devices to augment their television watching experiences (such as when using a laptop to track election results or sports scores while watching related content on the television). This trend is also likely to continue, as consumers are constantly seeking out additional information related to a television program, even while watching the programming. Advances in television services and Internet media content related to television services have facilitated this behavior. Ever increasing and accessible ways of manipulating television programs are becoming available (e.g. picture in picture displays, pausing live programs via digital video recorders (DVRs) and the like, etc.). Likewise, increasing amounts of Internet media content related to television programs is becoming available.

However, there is currently no conventional way for allowing a user to have a truly integrated television and Internet media experience. Even when watching television programs on an Internet-connected device (e.g. laptop, desktop or mobile computing devices), a truly integrated experience is lacking, as consumers must choose between watching the program or browsing the Internet. Consequently, consumers resort to switching between media devices (e.g. between television and laptop) or applications manually, in a time consuming and disjointed fashion.

Accordingly, the inventors have recognized a need for providing consumers interested in simultaneously and flexibly experiencing the best of television and the Internet with one integrated system that is compatible with and complements their currently used devices.

SUMMARY OF THE INVENTION

At least one presently preferred embodiment of the present invention broadly contemplates a system providing an integrated television and Internet media experience. The system provides for automatic identification of source media content input, such as a cable television program or Internet program, analysis of the identified source media content input, retrieval of related (e.g. Internet) content, and integration of the source media and the related (e.g. Internet) content for display.

In summary, at least one aspect of the present invention provides a computer implemented method comprising: identifying a source media content input to an electronic device; automatically obtaining related media based upon the identifying; and preparing the source media content and the related media for output to a display device.

Another aspect of the present invention provides an apparatus comprising: at least one processor; and a tangible program storage device configured to store a program of instructions that when executed by the at least one processor enable the apparatus to: identify a source media content input to the apparatus; automatically obtain related media based upon the identifying; and prepare the source media content and the related media for output to a display device.

A further aspect of the present invention provides a tangible program storage device, readable by machine, embodying a program of instructions that when executed by a processor of the machine enable the machine to: identify a source media content input to the machine; automatically obtain related media based upon the identifying; and prepare the source media content and the related media for output to a display device.

Another aspect of the present invention provides a method comprising: receiving information related to content for display provided by an external device via a network connection; identifying the information related to content for display and producing an identification result based on the identification; and transmitting an identification result to the external device via the network connection.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE INVENTION

Figure 1:
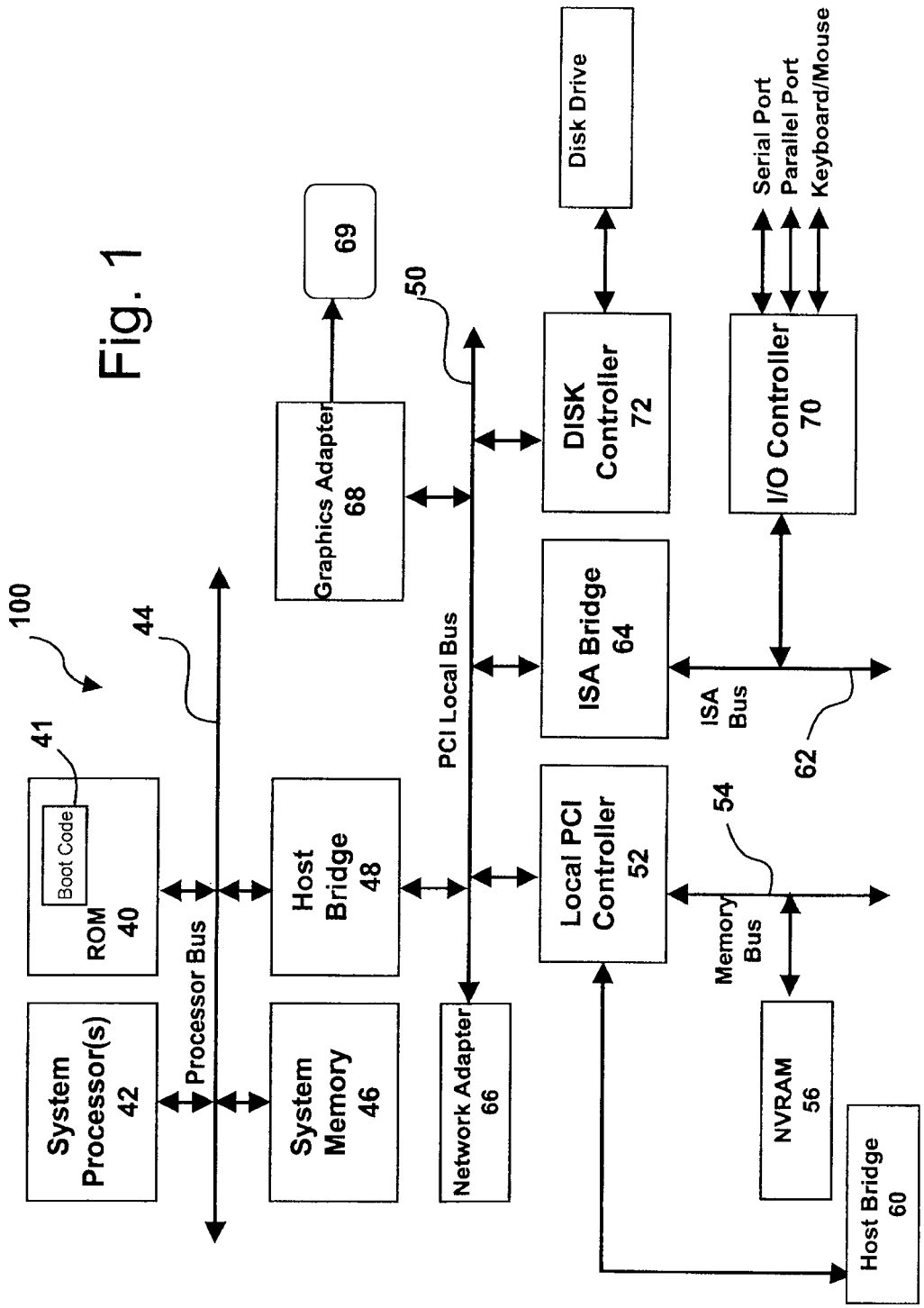
FIG. 1 shows a block diagram of a computer system.

It will be readily understood that the components of the present invention, as generally described and illustrated in the figures herein, may be arranged and designed in a wide variety of different configurations in addition to the described presently preferred embodiments. Thus, the following more detailed description of the embodiments of the present invention, as represented in the figures, is not intended to limit the scope of the invention, as claimed, but is merely representative of selected presently preferred embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings. The following description is intended only by way of example, and simply illustrates certain selected presently preferred embodiments of the invention as claimed herein.

According to at least one presently preferred embodiment of the invention, there is provided an Internet Media Computing System (media management system) which includes a component media source, a network-connected Internet Media Computer (computer), and at least one display. The media management system automatically identifies source media content. The media management system then uses the identification results to retrieve targeted media content. The media management system also enables integration (e.g. overlay) of the component source media content with the additional targeted media content for combined display to the user.

The source media content can be essentially any media, but it is presently preferred that the source media content comprise media content such as a cable television program from a component media source (e.g. a cable box, a satellite TV receiver, a DVD player, etc.) or Internet media content (e.g. streaming Internet television or video played via a computer). The additional targeted media content can likewise come from a variety of sources. It is presently preferred that the targeted media content comprise Internet derived media content related to the source media content identified; however, it should be understood that the related content could be pre-selected and/or locally stored.

According to one embodiment of the invention, the media management system provides integration of a source media content, such as a cable television program, input from a component media source, with related media (e.g. Internet content) via an Overly/Pass-through Device (OPD). It should be noted that the OPD may be internal to a media management system computer or external thereto. Thus, although a specific example is illustrated in the figures, alternative arrangements will be apparent to those having ordinary skill in the art and are considered to fall within the scope of the invention, as claimed. The media management system is the first solution providing seamless integration of source media content from an existing content playback device (e.g. a cable box, personal video recorder (PVR), etc.) with related (e.g. Internet) content.

The media management system is thus configured to dramatically simplify the process of adding a wide-range of user-controlled Internet content from a variety of Internet media providers. The media management system facilitates addition of related Internet media content to a display (e.g. HDTV set) that already has other input media sources (such as a cable box, satellite TV receiver, a DVD player, etc).

It should be noted that the instant invention is described in an exemplary and non-limiting fashion and that the invention is generally applicable to any computer or electronic device, whether connected to a HDTV or other display device (e.g. a computer monitor). It is should also be noted that the terms "media management system", "Internet Media Computer" and "computer" (and the like) are used throughout this description for ease of discussion. However, it will be readily understood by those having ordinary skill in the art that the invention may be implemented on any electronic device(s) appropriately configured (e.g. that employ appropriate hardware and/or software) to implement the functionality of the invention, as disclosed herein.

Referring now to FIG. 1, there is depicted a block diagram of an illustrative embodiment of a computer system 100. The illustrative embodiment depicted in FIG. 1 may be a notebook computer system, such as one of the ThinkPad® series of personal computers sold by Lenovo (US) Inc. of Morrisville, N.C. or a workstation computer, such as the Thinkstation®, which is also sold by Lenovo (US) Inc. of Morrisville, N.C. As will become apparent from the following description, however, the present invention is applicable to operation by any appropriately configured data processing system or other electronic device.

As shown in FIG. 1, computer system 100 includes at least one system processor 42, which is coupled to a Read-Only Memory (ROM) 40 and a system memory 46 by a processor bus 44. System processor 42, which may comprise one of the processors produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN 10, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a keyboard, mouse, and a disk drive. In addition, I/O controller 70 supports external communication by computer system 100 via serial and parallel ports. The USB Bus and USB Controller (not shown) are part of the Local PCI controller (52).

Figure 2:
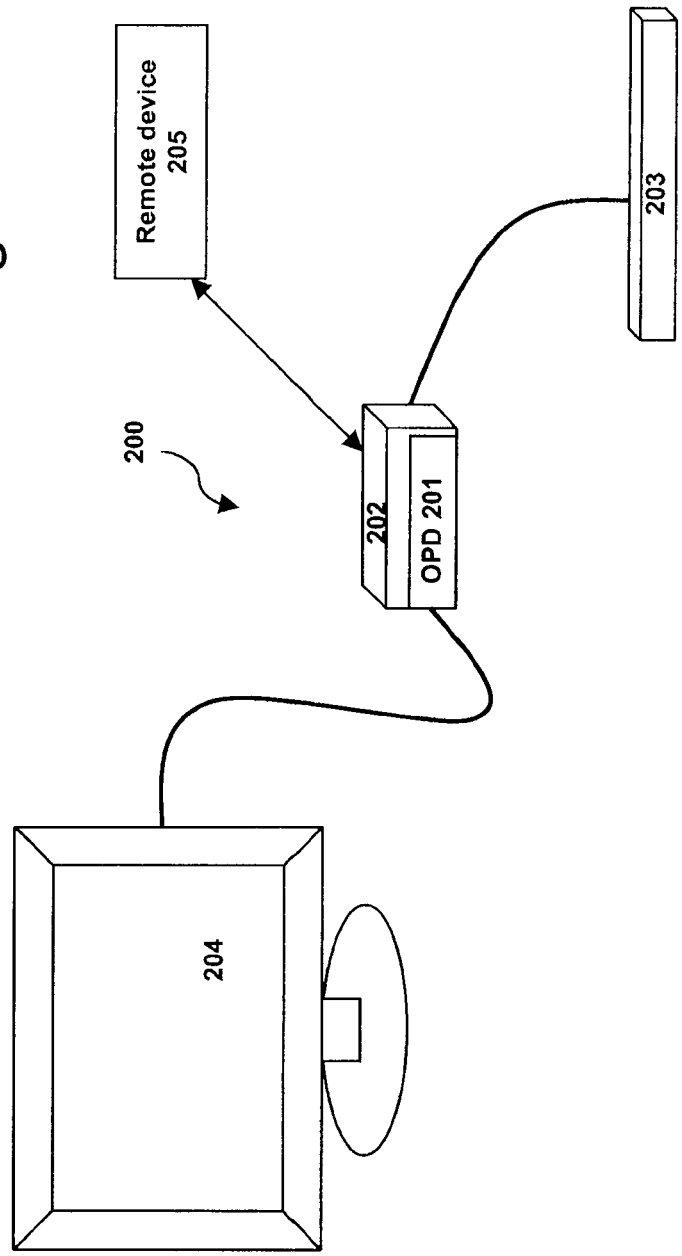
FIG. 2 shows an in-line media management system.

FIG. 2 depicts a non-limiting example of the media management system configured according to one embodiment of the invention. As shown in FIG. 2, the media management system is configured in an "in-line" arrangement (200), i.e. component media source (203) is connected to the computer (202) which is in turn connected to at least one display (204). The media management system enables component media source content/data (e.g. a live stream from a cable TV box) to be combined (overlaid) with the additional targeted content (e.g. related Internet content). A user first plugs his or her existing component media source (203) (e.g. cable box, satellite receiver, PVR, DVD player, MPEG-4 player, etc.) into the computer (202). The component media source may provide uncompressed digital data via a high definition multimedia interface (HDMI) or other digital or analog connection types. The computer (202) can be an electronic device such as the computer system (100), described in FIG. 1 above. Then, the user plugs the computer (202) into the display device (204) (e.g. HDTV set).

The OPD (201) is what allows for the seamless integration of the content from the component media source (203) with the additional targeted content (e.g. Internet content retrieved by the computer (202) from a remote device (205), such as a remote server accessed via an Internet connection). The OPD (201) may be either directly or indirectly integrated into the computer (202) or other similar device, though as shown the OPD (201) is internal to the computer (202). Data (e.g. video and/or audio data streams) routed through the OPD (201) may be of one or more formats using one or more connection types (e.g. S-Video, RCA audio, Toslink, Component Video, HDMI, DisplayPort, etc.).

The computer (202) provides additional targeted content media output (e.g. related Internet content) to the OPD (201). The computer (202) also provides formatting instructions to the OPD (201) describing how to prepare the output for display, e.g. overlay of the computer media output with the component media source output (203). The formatting instructions are transmitted from the computer (202) to the OPD (201) via a suitable connection (e.g. USB).

The display of source media content and/or additional targeted content (provided by the computer) is preferably user-selectable and adjustable. As above, the media is prepared for display, which can include a wide variety of different modes of display, examples of which are given below. The ODP (201) can operate in a "pass through" mode ("single-format HDMI implementation") when powered down or off, making it completely passive in that state. For example, the media management system (200) is configurable to selectively allow the source media content to take up the entire screen and provide all audio, effectively hiding the computer user interface (i.e. letting the source media content (e.g. cable TV program) pass-through to the display (204)). Alternatively, the media management system (200) is configurable to selectively allow the additional targeted content media output stream to fill the screen, providing all audio and video to the display (204).

Notably, the media management system (200) is configurable to selectively allow the additional targeted content output stream and the source media content stream to be combined or integrated. For example, the two media can be overlaid by the OPD (202), for example by indicating a quadrilateral region within the additional targeted content media output stream where the source media content should be displayed, providing the desired display scenario. This could take many forms, including a "picture-in-picture" effect, including advanced 3-D versions of this kind of effect.

FIG. 2 shows the OPD (201) as internal to the computer (202), though as above, this is only a non-limiting example. The illustration of FIG. 2 shows a single component media source (203) (e.g. cable TV box), however, it is should be appreciated that others may be utilized as well. Thus, the OPD (201) may have multiple inputs and/or outputs allowing the described functionality to work with more than one component media source (203) and/or more than one display (204).

The media management system (200) dramatically simplifies set-up and installation for the user since the user does not need to reconfigure inputs on the display (204) (e.g. HDTV set) or the home media receiver (i.e. the component media source (203) (e.g. cable TV box)). The media management system (200) enables the user to accomplish the retrieval and display of related content, selectively, without requiring the media management system computer (202) to act as the TV tuner. This simplifies the set up of the system and allows the users to continue utilizing a conventional TV configuration with which they have become familiar. In other words, the cable TV box or satellite TV box is seamlessly integrated into the media management system (200), rather than being replaced by a complex, media management system specific tuner.

Identifying Media Content

According to one embodiment of the invention, a system and method for identifying source media content is provided. Source media content being presented (or played, shown) from a media source (e.g. a component media source or an Internet-media source) is identified. While there are several ways to identify media content, presently it is preferred that the method for identifying media content be broadly applicable and enable fast (i.e. real time) identification, for example suitable for identification of television programs within a matter of seconds. Presently preferred methods of identification of media content include fingerprinting, identification utilizing metadata from the content source/stream (e.g. service provider information), program information, and/or closed caption data, etc.

The most presently preferred method is identification through digital fingerprinting. Digital fingerprinting comprises audio and video fingerprinting and has been utilized for a variety of reasons, e.g. combating piracy of copyrighted works. See http://en.wikipedia.org/wiki/Digital_video_fingerprinting. Various suitable methods for implementing digital fingerprinting for identification are available, such as those described in U.S. Pat. No. 7,421,376, entitled "Comparison of Data Signals Using Characteristic Electronic Thumbprints", and U.S. patent application Ser. No. 11/219,385, filed Sep. 1, 2005, entitled "Extraction and Matching of Characteristic Fingerprints from Audio Signals", both of which are incorporated by reference here. Suitable fingerprinting technology is currently available from a variety of companies, such as Digital Smiths®. See http://www.digitalsmiths.com.

Video fingerprinting is a technique that automatically analyzes the video stream to identify and extract key items from the video stream. This permits the generation of relevant content from the Internet or other source(s) that is related to the identified stream (described further below). Preferably, captured data (e.g. temporarily buffered frames) are sent from the OPD for identification every N frames.

As above, the OPD (201) may provide a variety of information to the computer (202) for identification, including fingerprint data, metadata from the content source/stream, closed caption data, screen captures, etc. The processing required for producing captured media for identification analysis of media content sources may occur within the OPD (201) itself or within the main computer (202). Thus, it is not necessary for captured media data from the media source to be processed by the computer's central processing unit (CPU) or graphics-processing unit (GPU). Rather, the processing can also done within the OPD (201). Communication of selected video frame data, or specific video frame fingerprint data, etc., happens via a control channel, for example over a USB.

The identification is essentially a matching process whereby the captured data (e.g. fingerprint data from a screen capture of the source media content) is compared and matched with known fingerprint data stored in a database. This identification may happen either at the computer (202) or via a remote process, as further described below. It is presently preferred that if the identification method chosen is fingerprinting, then the identification analysis be completed at a remote location (e.g. at a remote server or data center).

Figure 3:
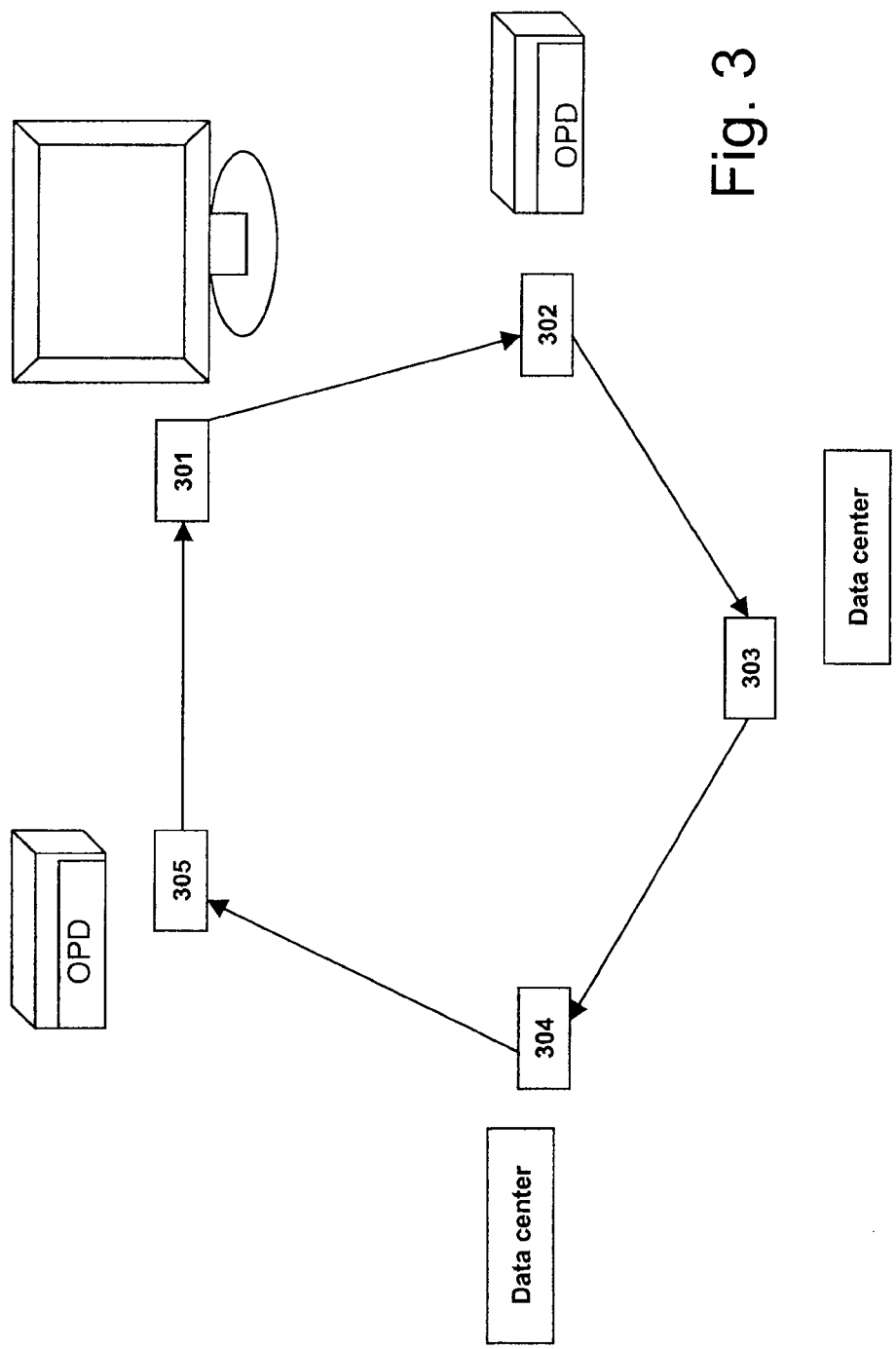
FIG. 3 illustrates a method for identifying source media.

FIG. 3 illustrates a high level view of identifying source media content being presented (or played, or shown) from a media source (e.g. a component media source or Internet media from an Internet-connected computer). At (301) the OPD (202) has access to the media source content (e.g. component media source (203). At (302) the OPD (202) periodically captures data (e.g. takes snapshots of the video stream) and sends the captured data (e.g. video frame) to the computer (202). A presently preferred rate for capturing data (e.g. screen shots for fingerprinting) is one captured frame per 5-10 seconds.

At (303) the computer (202) (or the OPD (201) itself) processes the captured data into key fingerprint data and passes the fingerprint data to a remotely located data center for analysis. It should be noted, however, that the data center could be a local component of the media management system (e.g. stored on or connected to the computer (202)). However, it is presently preferred to have the data center located on a remote component (e.g. a server accessible via an Internet connection). At (304) the data center identifies the source media content (e.g. the program being watched on the TV set) via matching the captured fingerprint data to known, stored fingerprint data (e.g. supplied by a video content database). The data center sends the identification information back to the computer (202). At (305) the computer has the identification data sent by the data center which it can utilize to provide customized additional targeted content to the user, displayed (selectively) on the display (204) (e.g. HDTV set).

In the data center, fingerprint data for existing video content such as commercial TV programs and movies is collected and stored in a database. The database(s) can be updated accordingly. The media management system is capable of utilizing existing fingerprint databases; however, customized databases having selected fingerprint data corresponding to popular media is presently preferred.

An embodiment of the invention provides real-time identification of source media content (e.g. live TV programs). "Real-time" is defined herein as contemporaneous or within a very short time delay (i.e. on the order of seconds to minutes). The data center returns identification results and related content being collected in real-time by digital TV tuning and capturing devices.

Optionally, editorial input can augment the data center's database(s). For example, the media source content data title can be used by the computer to retrieve related media according to instructions stored within, e.g. a data table of the computer or the data center. Such a data table provides instructions for retrieval of related media that has been preselected based on editorial input and related to each data title, discussed further below. Editorial input is particularly helpful in the event that the database(s) do not contain any relevant comparing information, as would likely be the case for certain media source content/data (e.g. live, unscheduled and/or local television programs). Editorial input can include, but is not limited to, employee input based on observed live programming (e.g. an employee provides identification information, etc., for a live program while watching the live program).

Which types and the amount of information the database(s) contain and support is essentially a design choice. However, it is presently preferred that the system be configured to cover all of the major TV channel programs (e.g. national "top 100", etc.), thereby creating a real-time video fingerprint in the data center for this media, matched to program guide data for that tuner and managed if necessary by editorial input. This method allows video fingerprinting to return a program identification result to the computer in real time, even if that program is a live sporting event or a news event not previously scheduled, or a TV commercial not previously identified.

In addition to identifying programs from the component media source (203) as described above, according to one embodiment of the invention, source media content from media played by the computer (e.g. the computer's media player, streaming Internet media played by the computer's web browser) is identified by the same method (e.g. fingerprinting). By fingerprinting all source media content played on the media management system regardless of the source (i.e. whether played over the OPD from an integrated media player, from a web browser plug-in or add-in, etc.), identification of source media content as specified above can be performed for any known content rendered by the media management system or by connected component media sources (203).

With the methods described herein, video can be identified and program information returned to the computer in real time, regardless of the source of the video, whether it comprises streaming Internet video, DVD playback, Satellite TV, Cable TV, digital TV of a variety of formats, or other sources. This method for real-time video identification from a variety of video sources, delivered to a consumer device across the Internet, provides unique and new consumer benefits. For example, this approach allows for presentation of related Internet content, advertising, profiling, etc. on the display, regardless of the source of the content or the method of playback. Select, representative benefits are discussed further below.

Providing Targeted and Integrated Media Experiences

According to one embodiment of the invention, targeted, integrated media experiences based on TV and Internet source media content consumption are provided. Once program information is identified (e.g. via using video fingerprinting, as described in connection with FIG. 3), this program identification information is then used to provide customized web experiences, based on the program being watched on the component media source, or the Internet media being watched using the computer. The related media may be obtained from a variety of sources, including but not limited to obtaining the related media via an Internet query of a database containing pre-selected content, as discussed below.

Figure 4:
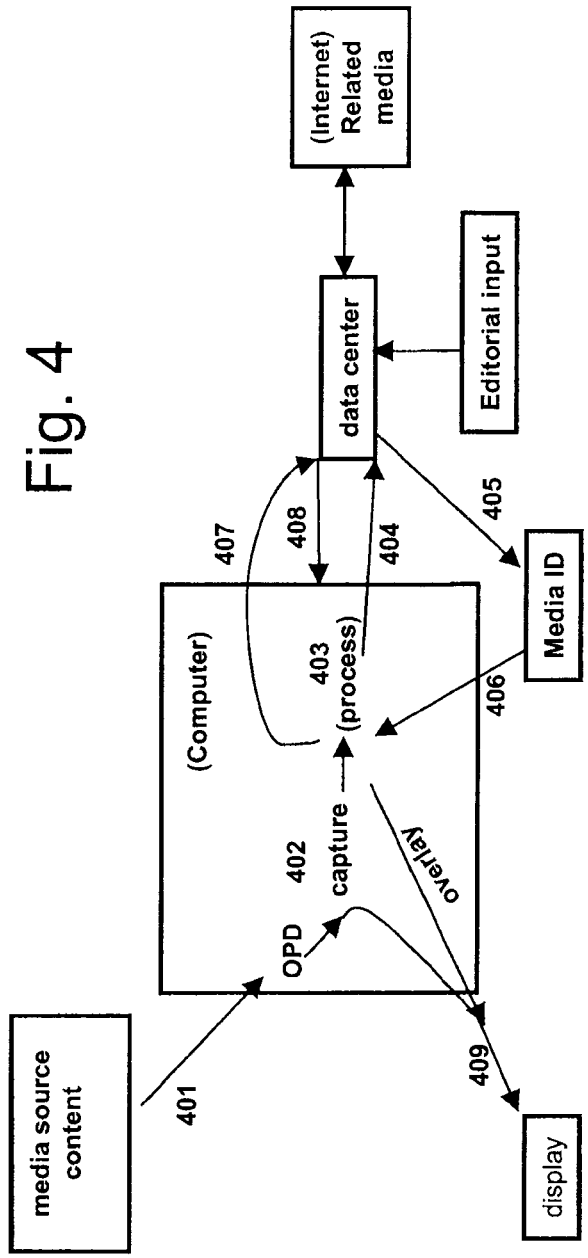
FIG. 4 illustrates a method for obtaining targeted related media and integrating it with source media for display.

FIG. 4 illustrates a non-limiting and exemplary method for retrieving additional targeted content. The media management system can utilize the identification information to obtain additional targeted content that is then overlaid with the component source media content, as desired. As shown, the source media content/data flows into the computer at (401). It should be noted that the source media content/data (to be identified) could originate from more than one source, including the computer itself (e.g. as when the user is watching a program streamed via the Internet). In this instant example, however, it is assumed that a source media content is derived from the component media source (203).

As discussed, at (402) the OPD sends selected data (or already-processed video fingerprint data if the ODP is configured to process fingerprint data) to the computer. The presently preferred rate of capture is one frame every 5-10 seconds, with one frame per 5 seconds presently being most preferred. The video fingerprint data is a collection of data derived from selected frames of the source media content/data (e.g. video) from the connected component media source, such as a cable TV box. At (403), the captured data is passed to the computer at the predetermined rate via an appropriate connection (e.g. USB) and processed.

At (404) the fingerprint data is then preferably sent by the computer to the data center via a network connection (e.g. an Internet connection) where it is compared to video fingerprint data of known (e.g. TV and movie) content. At (405) the data center conducts the fingerprinting analysis and identifies the source media content/data. At (406) the identification information, e.g. the title and other relevant program information, is sent back to the computer via the network connection.

Once step (406) has been completed, the computer is in possession of identification information regarding the source media content/data being played (e.g. presented on the display). At (407), the computer then utilizes the identification information to retrieve additional targeted content. Naturally, a certain amount of related content could be stored on the computer itself or another local component. However, it is presently preferred that the computer query a remote device such as the data center at (407) to identify targeted content. The query may be an Internet query (e.g. using a browser implemented on the computer) or a query of a database prepared with pre-selected content, as by way of editorial input for certain media sources (e.g. national top 100 channels and/or movies). For example, for a certain number of programming channels, a data table on the Internet can be queried (referenced) by the computer with the program identification information. Based on the program identification, a pre-selected assortment of Internet content will be displayed to the user by the computer. Editorial input and search query logic is preferably used to create the data table, which determines the Internet content returned for each supported program.

The targeted content is related to the identified source media content in some relevant way. For example, the computer could use the source media content title identified in the media ID information to conduct a Google® Internet query at (407). The top n results could be returned at (408) to the computer as related media. As discussed above, source media content can be utilized to retrieve related media that has been pre-selected and stored, via editorial input, into the computer or remote location (e.g. database). As can be seen, based on the identification of the source media content, a wide variety of targeted additional content can be identified via the Internet and obtained quickly.

As discussed above, the media management system is configured for preparation and selective display of various media. The preparation of media for selective display includes but is not limited to preparation of media for a pass through mode, in which the source media content is displayed, an integration or overlay mode, in which both the source media content and the related media content are displayed, and mode in which the related media content is displayed.

Referring to FIG. 4, if the computer is powered off or selectively set to "pass through" mode by a user, the source media content (e.g. cable TV program) can fill the display screen, with no additional media being presented at (409). Alternatively, the additional targeted media (e.g. the related media obtained from the Internet) can fill the display if the user selects, thus essentially utilizing the computer as a web browser.

Most notably, the two media sources can be automatically overlaid at (409). Thus, the display will contain a mixture of the source media content (e.g. a cable TV program from component source) and the additional targeted content (e.g. the related content obtained from the Internet). This integrated display could take many forms. For example, a picture-in-picture type display could be utilized. Alternatively, the targeted additional content could be displayed on an additional display.

This provides the media management system with many possibilities for automatically augmenting the source media content for a more fulfilling user experience. For example, while watching a television show the user may selectively bring up the media management system user interface (e.g. by way of remote control). The television show will still be playing on the display, but now the media management system user interface automatically appears around the television show on the display (e.g. picture-in picture), offering other related content (e.g. Internet content) obtained for example utilizing the method outlined in conjunction with FIG. 4. As discussed above, the related content can be, for example, election results or sports scores, immediate access to related web sites, or any other media specified by some predetermined criteria as relevant to that source media content (e.g. the particular TV program being watched on the display). The predetermined criteria for determining relevance or related data are selectable and can be customized as is desired. As non-limiting examples, the predetermined criteria may be popularity-related criteria (e.g. Internet searching popularity) or commercially related criteria.

As a non-limiting example, the user may be watching an episode of a popular commercial television show as provided by a component media source (203) (e.g. cable TV box). With the media management system user interface (e.g. accessed via a remote control or button that executes an application program on the computer), information relevant to the specific popular commercial television show is automatically provided to the user (e.g. via the Internet query) on the integrated display. If the user navigates to any of this other related content or web sites using the computer's browser (e.g. Internet Explorer® web browser), the component media source can continue to play (for example, in a picture-in-picture, overlaid with the other content). The user may elect to hide the component media source content, or switch back to it in full screen, at any time (e.g. toggle between different display modes).

Similarly, the media management system can offer related content based on an Internet media source being accessed via the computer (202) rather than a component media source (203) (e.g. cable TV box). For example, if a user watches a commercial TV show using a streaming video site such as www.hulu.com or www.abc.com, the source media content being watched is identified, as per the methods described above with regard to the component media source (203) (e.g. fingerprinting), and used by the computer to again offer other related Internet media that the user is likely to enjoy.

The computer is configured to automatically decide what Internet experiences to offer to the user in the form of related content, whether in the form of web pages, or web video streams, etc., using the identified source media content watched as input. Users will select (e.g., "click" or "depress" or "press") on some related content that is offered, and not other related content, and this behavior creates feedback data that can be used to further refine the selections offered to the user in the future. For example, selection data (e.g., click-through data) is captured and sent to the data center via the Internet. Data from the user, and other users, is aggregated at the data center. Internet content offerings can be made or refined based on what that user, and other users with similar media consumption habits, are most likely to select ("click on").

This collaborative filtering approach, when applied to media consumed and identified by source-independent media identification (e.g. fingerprinting), provides a method that enables custom Internet experiences to be offered to a user based on their own, and other users', media consumption spanning a variety of devices, including online video consumption.

As a non-limiting example of a filtering approach, with this system, a user who watched last week's episode of a television program (e.g., "HEROES" television program offered by television network NBC UNIVERSAL®) could be proactively offered this week's episode to stream or download from a popular web site. The computer could also offer (or show, or display, or load) web sites deemed relevant based on past behavior. For example, Wikipedia® sites, fan sites, and other Internet sites, which are presented by the computer, based on the user's TV watching or Internet browsing behavior. In such configurations, additional information, specifically about the show, e.g., HEROES, can be shown in real time, while watching the show's first airing on live TV, just by selecting (or clicking or pressing) a button on the remote control or on the screen, and entering the media management system experience (e.g. beginning the identification process, etc.).

Because of the OPD, described above, the user can be shown relevant Internet information regarding the still-playing TV program on the same screen. In another example, a user who watched last week's sporting event, for example, a football game featuring the user's favorite team, could be offered to watch the next football game on Live TV. The user could likewise be offered statistics, player updates, and other fan information about the football team (e.g. relevant media available online).

Thus, the configurations as disclosed automatically provide users with custom Internet media selections in real time, based, for example, on their own TV watching behavior and Internet streaming media consumption. It should be noted that peripheral devices (e.g. keyboard, mouse, etc.) are compatible with the computer of the media management system and can be utilized if the user decides to proactively interface with the media management system. For example, the user may want additional Internet information based on the automated related information provided by the media management system. The user could thus conduct his or her own Internet search.

In brief recapitulation, according to at least one embodiment of the invention, the user of the system is provided with an integrated television and Internet media experience. The system provides for the automatic identification of source media content, automatic analysis of the identified source media content, automatic retrieval of related (e.g. Internet or locally stored) content, and automatic integration of the source media content and the related content for display.

Many of the functional characteristics of the inventive system described in this specification may be implemented as modules. Modules may include hardware circuits such as one or more processors with memory, programmable logic, and/or discrete components. The hardware circuits may perform hardwired logic functions, execute computer readable programs stored on tangible storage devices, and/or execute programmed functions. The computer readable programs may in combination with a computer system and the other described elements perform the functions of the invention.

It will be readily understood by those having ordinary skill in the art that embodiments of the present invention may take the form of an entirely hardware embodiment or an embodiment containing both hardware and software elements. An embodiment that is implemented in software may include, but is not limited to, firmware, resident software, microcode, etc.

The computer readable programs may be stored in tangible computer/machine-readable (apparatus readable) medium. Examples of a computer/machine-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Accordingly, elements of the present invention may be implemented on at least one computer running suitable software programs. These may also be implemented on at least one Integrated Circuit or part of at least one Integrated Circuit. Thus, it is to be understood that the invention may be implemented in a combination of both hardware and software. Again, computer/machine-readable programs may in combination with a computer system perform the functions of the invention.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

In the drawings and specification there has been set forth a preferred embodiment of the invention and, although specific terms are used, the description thus given uses terminology in a generic and descriptive sense only and not for purposes of limitation.

If not otherwise stated herein, it is to be assumed that all patents, patent applications, patent publications and other publications (including web-based publications) mentioned and cited herein are hereby fully incorporated by reference herein as if set forth in their entirety.

What is claimed is:

1. A computer implemented method comprising:
   receiving, at a user electronic device, source media content;
   the source media content comprising displayable video content;
   capturing displayable video information from the source media content at the user electronic system for identification of the source media content;
   wherein the identification includes digital fingerprinting, comprising:
      capturing video frame data from the source media content, wherein the capturing video frame data from the source media content proceeds in a predetermined manner, wherein the predetermined manner comprises capturing video frame data during predetermined frames;
      transmitting selected portions of the captured video frame data from the user electronic device to a second device via a network connection; and
      receiving an identification result including the program information from the second device via the network connection;
   receiving program information from a remote data center based on the identification result, wherein the program information comprises a title of the program;
   automatically obtaining related media based upon the program information from a remote data center;
   wherein the automatically obtaining related media further comprises:
      utilizing the program information from a remote data center to execute an Internet query for related media;

receiving at least one query result from the Internet query as related media, wherein the receiving comprises obtaining related media pre-selected and stored in a database; and preparing, at the user electronic device, the source media content and the related media for output to a display device operatively coupled to the user electronic device, wherein the related media content is overlaid onto the source media content.

2. The computer implemented method according to claim 1, wherein the source media content comprises video content derived from a source selected from a group consisting of a cable television box, a satellite receiver, a DVD player, and an Internet source.

3. The computer implemented method according to claim 1, wherein the identification further comprises identifying the source media content utilizing closed caption data.

4. The computer implemented method according to claim 1, wherein the capturing video frame data from the source media content proceeds at a predetermined rate.

5. The computer implemented method according to 1, further comprising:

selectively displaying media content on the display device in one of a plurality of modes, the plurality of modes comprising:
a pass through mode whereby only the source media source is displayed;
a related media mode whereby only the related media is displayed; and
an integrated mode whereby both the source media source and the related media are displayed.

6. The computer implemented method of claim 1, wherein more than one source media content has the same program information.

7. A user apparatus comprising:
at least one processor; and
a program storage device that stores a program of instructions that when executed by the at least one processor enable the user apparatus to:
receive at the user apparatus source media content;
the source media content comprising displayable video content;
capture displayable video information from the source media content at the user apparatus for identification of the source media content;
wherein the identification includes digital fingerprinting, comprising:
capture of video frame data from the source media content, wherein the capture of video frame data from the source media content proceeds in a predetermined manner, wherein the predetermined manner comprises capture of video frame data during predetermined frames;
transmission of selected portions of the captured video frame data from the user electronic device to a second device via a network connection; and
receipt of an identification result including the program information from the second device via the network connection;
receive program information from a remote data center based on the identification result, wherein the program information comprises a title of the program;
automatically obtain related media based upon the program information from a remote data center;
wherein to automatically obtain related media further comprises:
utilization of the program information from a remote data center to execute an Internet query for related media; and
receipt of at least one query result from the Internet query as related media, wherein the receipt of at least one query result comprises obtainment of related media pre-selected and stored in a database; and
prepare, at the user apparatus, the source media content and the related media for output to a display device operatively coupled to the user apparatus, wherein the related media content is overlaid onto the source media content.

8. The apparatus according to claim 7, wherein the source media content comprises video content derived from a source selected from a group consisting of a cable television box, a satellite receiver, a DVD player, and an Internet source.

9. The apparatus according to claim 7, wherein to identify further comprises identifying identification of the source media content utilizing closed caption data.

10. The apparatus according to claim 7, wherein the capture of video frame data from the source media content proceeds at a predetermined rate.

11. The apparatus according to claim 7, wherein the program of instructions further enables the apparatus to selectively display media content on the display device in one of a plurality of modes, the plurality of modes comprising:
a pass through mode whereby only the source media source is displayed;
a related media mode whereby only the related media is displayed; and
an integrated mode whereby both the source media source and the related media are displayed.

12. A program storage device, readable by machine, embodying a program of instructions that when executed by a processor of the machine enable a user electronic device to:
receive at the user electronic device source media content;
the source media content comprising displayable video content;
capture displayable video information from the source media content at the user electronic device for identification of the source media content;
wherein the identification includes digital fingerprinting, comprising:
capture of video frame data from the source media content, wherein the capture of video frame data from the source media content proceeds in a predetermined manner, wherein the predetermined manner comprises capture of video frame data during predetermined frames;
transmission of selected portions of the captured video frame data from the user electronic device to a second device via a network connection; and
receipt of an identification result including the program information from the second device via the network connection;
receive program information from a remote data center based on the identification result, wherein the program information comprises a title of the program;
automatically obtain related media based upon the program information from a remote data center;
wherein to automatically obtain related media further comprises:
utilization of the program information from a remote data center to execute an Internet query for related media; and
receipt of at least one query result from the Internet query as related media, wherein the receipt of at least one query result comprises obtainment of related media pre-selected and stored in a database; and prepare, at the user electronic device, the source media content and the related media for output to a display device operatively coupled to the user electronic device, wherein the related media content is overlaid onto the source media content.

\* \* \* \* \*